United States Patent Office 3,062,520
Patented Nov. 6, 1962

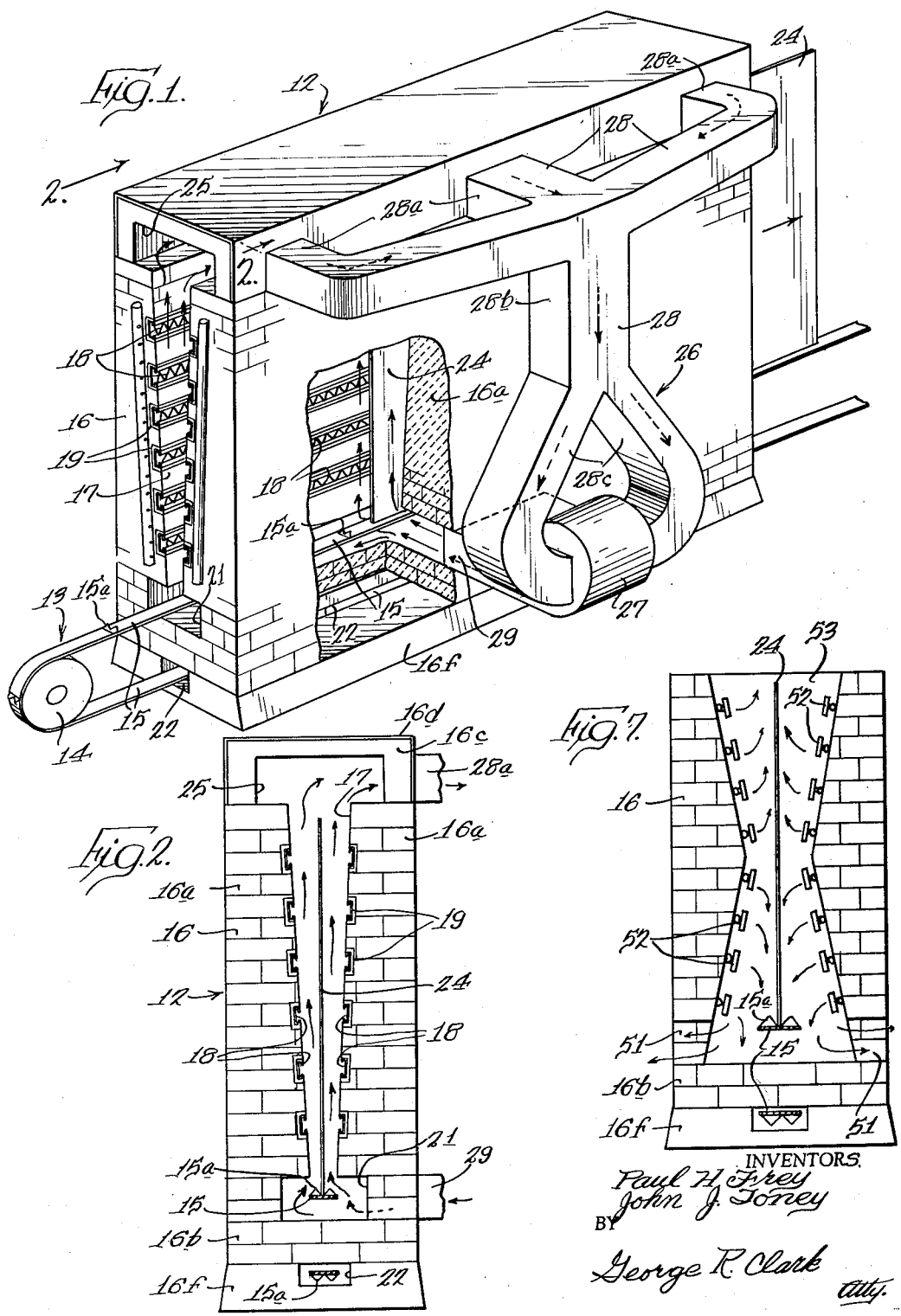

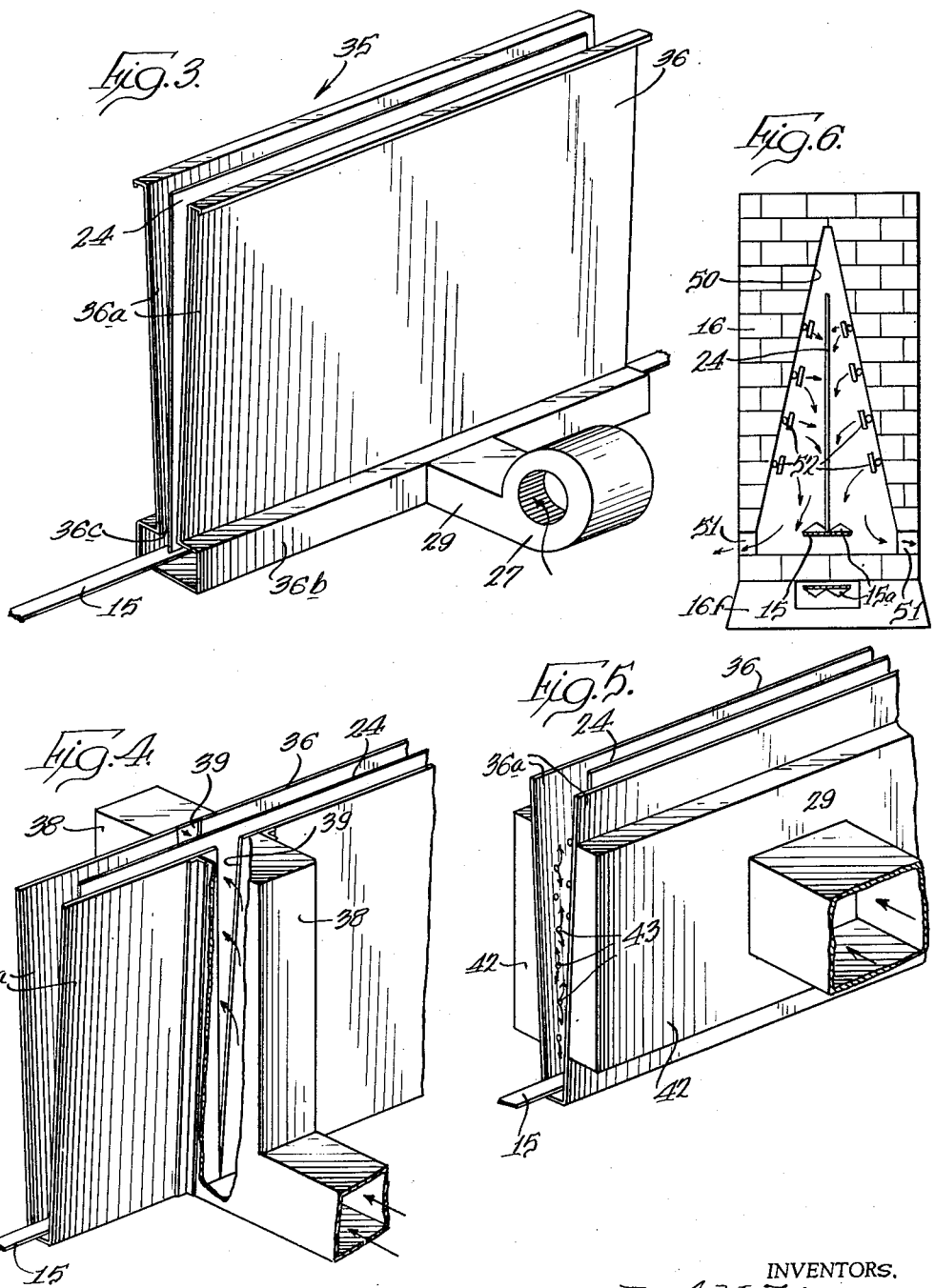

3,062,520
CONVEYING APPARATUS FOR SHEET MATERIAL EMPLOYING FLUID SUPPORT MEANS
Paul H. Frey, Lansing, and John J. Toney, South Holland, Ill., assignors to Sunbeam Corporation, Chicago, Ill., a corporation of Illinois
Filed Aug. 19, 1957, Ser. No. 678,804
18 Claims. (Cl. 263—8)

This invention relates generally to material conveying apparatus and more particularly to apparatus for supporting and conveying sheet material as it is moved through a heat treating furnace.

In designing material supporting and conveying apparatus for use in furnaces, there are many problems arising from the high temperatures present in the furnace and the necessity for care in handling the material while it is being heat treated. In the case of relatively small pieces of material, baskets and trays may be easily used to contain the pieces and transport them through the heat treating zone of the furnace. In the heat treatment of continuous sheets of material, however, no satisfactory means has been devised to convey the material through the furnace. This is also true of successive pieces of sheet material which are to be transferred through a continuous process type of heat treating furnace. It is usually required that the sheet material have an unmarred surface after the heat treatment is complete. Any scratches, nicks or abrasions on such sheet material are particularly objectionable since it is frequently used in a finished product without any additional machining, rolling or polishing.

Many metals which are rolled into sheet form, heat treated, and incorporated in finished products, are materials which become especially vulnerable to scratching and abrading since they are very soft during the heat treating process. Sheet aluminum is an example of a metal of this type. In the volume production of large pieces of sheet aluminum and continuous strips of sheet aluminum, there has been a long felt need for conveying apparatus which would carry the material through the heat treating portion of the furnace without scratching or marring the smooth surface of the material.

In the prior art there are disclosures of apparatus wherein sheet or web material has been supported by pneumatic means to avoid contact between the sheet or web material and the conventional supports or rollers of a conveyor. In such applications the web material is transferred in the horizontal position with vertically directed jets of air providing the support. In addition, there have been applications where the conveyor rollers, along or around which the web material is fed, have been provided with air jets so that the web material is maintained in spaced relation to the rollers.

Although the above mentioned types of pneumatic supporting and conveying means provide a solution to the general problem of conveying web material without engaging the surface with any solid material, there are a number of reasons why such support means are not suitable or feasible for many applicaions. In a heat treating furnace application, it is necessary to subject the sheet to more or less uniform temperatures across both faces of the material. If it were necessary to supply large volumes of air to the lower surface of the sheet material being heat treated, it would be very difficult to maintain the upper and lower surfaces of the sheet at the same uniform temperature.

In addition, it is obvious that very large volumes of air would be required to support a sheet of metal in the horizontal position. If the supporting and conveying of heavy sheet materials by pneumtaic means were to become practical, it would be necessary to reduce the required air consumption considerably. The prior art applications of pneumatic supporting of sheet material have been concerned with paper, film, fabrics and other materials of low mass. In those applications the air requirements to effect the support of the material were comparatively low. If a reduction in the air consumption could be accomplished, pneumatic support for conveying apparatus would not only have practical application in the furnace field, but would also have more general application in the material handling field wherever it was found to be desirable to handle sheet material without engaging the faces of the sheet with any solid material.

The difficulties associated with handling sheets of material which have been recently painted are well known and could be easily solved by some type of pneumatic support apparatus. In addition, there are many instances where sanitary or cleanliness reasons make it desirable to handle sheets without contacting their surfaces with foreign objects. All these cases would be suitable applications for the pneumatic support principles.

It is therefore an object of this invention to provide material transfer apparatus in which sheet material may be handled without any engagement between the faces of the sheet and any solid object.

Another object of the invention is to provide material handling apparatus utilizing pneumatic or fluid support of sheet material whereby the material may be transferred without any scratching or abrading of the surface of the sheet material.

An additional object of the invention is to provide conveying apparatus which is particularly adapted to handling sheet material in a heat treating furnace so that the faces of the sheet are not engaged by any solid material.

It is another object of the invention to provide low cost apparatus for rapidly transferring sheet material using a gas or liquid as the supporting and conveying media.

It is another object of this invention to provide a material handling device for sheet material wherein said material is balanced by quantities of fluid introduced between the faces of the material and a pair of closely spaced walls.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

FIG. 1 is a perspective view of a furnace embodying the present invention;

FIG. 2 is a sectional view taken along line 2—2 of FIG. 1;

FIG. 3 is a perspective view of a material conveyor embodying the present invention;

FIG. 4 is a perspective view of another embodiment of a material conveyor embodying the present invention;

FIG. 5 is a perspective view of a third embodiment of a material conveyor embodying the present invention;

FIG. 6 is a sectional view of a furnace embodying another modification of the invention; and FIG. 7 is a sectional view of another furnace embodiment of the invention.

As was mentioned above, the instant invention may find broad application in any material handling situation where sheet material is to be supported or transported. The preferred embodiment of the invention involves the application of the material handling principles to a heat treating furnace for sheet material. As illustrated in FIG. 1, a heat treating furnace designated generally by reference numeral 12 is provided with an elongated heat treating zone through which sheets of material are transported. To transport the material therethrough, a suitable belt conveyor 13 is positioned in the bottom portion of the furnace. The belt conveyor 13 is of the form conventionally employed in the furnace art having a driving roller 14 positioned to engage one end of the conveyor. To actually support the material carried by the conveyor, a wire mesh belt 15 is formed in a loop which extends around the drive roller 14 and runs horizontally through the furnace to an idler roller which engages the far end of the loop formed by the belt 15.

At spaced positions along the conveyor belt 15 a number of centering fixtures 15a have been welded or otherwise secured to the wire mesh belt 15. The centering fixtures 15a are small steel plates which have notches formed at their center portions to receive the bottom edge of the sheet material carried by the belt 15. The need for accurately centering the sheet material will be better understood as the description of the invention proceeds.

The furnace 12 includes an enclosure of fire resistant material 16 through which an elongated opening 17 extends. The enclosure 16 is conventionally made of various types of brick and castable refractory material. In the particular design shown in FIGS. 1 and 2 the enclosure 16 is defined by the substantially vertical walls 16a which are of brick construction and a base 16b which is also of brick construction. The top of the enclosure 16 is formed by a cap member 16c which is of castable refractory material molded within a steel shell 16d. Thus, the top 16c, the side walls 16a and the bottom 16b form the elongated open ended tunnel 17 through which sheet material is passed for heat treating purposes.

As a support for the entire furnace, a foundation 16f of concrete is positioned beneath the bottom 16b of the furnace.

The material within the enclosure 16 is heated by means of electrical strip heaters 18 which are suitably mounted within C-shaped channel members 19 which have been included as integral parts of the walls 16a of the enclosure 16. The channel members 19 are made of castable refractory material and extend the length of the furnace. They are received in suitable recesses in the walls 16a. The strip heaters 18 are formed of resistance material which is non-corrosive and unaffected by the high temperatures resulting from the energization of such heaters. The heaters are of zig-zag shape and extend the length of the tunnel 17 within the channel members 19. As can be seen in FIG. 2, a plurality of the heater elements are provided along each of the walls 16a. By so positioning the heating elements, it is possible to obtain a reasonably constant temperature across the entire face of each side of the sheet being transported therethrough. The arrangement of the brick and refractory material and the furnace heaters has not been described in detail inasmuch as this is conventional structure in the furnace art. Applicant's invention is concerned with the means for supporting sheet material in a furnace of this type rather than the details of the furnace itself, except insofar as the furnace must be modified to accommodate the distribution system for the support medium.

Applicant's invention broadly involves the use of a fluid medium which is passed between the sheet of material to be supported and the walls which are positioned in closely enclosing relation to the sheet. It has been found that by introducing equal volumes of fluid on either side of the sheet material it will tend to remain well centered between the walls of the enclosure by reason of the force exerted by pressure on both sides of the sheet. Any displacement of the sheet from its centered position between the walls tends to cause the pressure on the side having the greater spacing to be lessened to such an extent that the sheet will again move toward the center position. In applying this principle to various embodiments, it has been found that the fluid may be introduced through a single common manifold along the base of the sheet or through several spaced manifolds extending along the bottom of the sheet. Although it is generally more advantageous to introduce the fluid through manifolds located at the base of the material, apparatus utilizing fluid supply at the top of the sheet material is also practical and within the purview of the invention. In addition, it has been found that the fluid may be introduced through a series of holes or channels located in various positions in the walls facing the sheet.

In some instances the combustion gases from closely located burners may serve as the fluid supporting medium for the sheet material.

To accommodate the conveyor 13, the furnace 12 has a pair of longitudinally extending ducts or channels 21 and 22. The lowermost channel 22 is only slightly larger than the conventional belt 15 which is to pass therethrough. The upper channel 21, which is substantially larger, serves a second and more important function of delivering the supporting fluid to the sides of the sheet material. The channel 21 is in continuous communication throughout the length of the furnace with the tunnel 17 within which the furnace heaters are positioned.

So that the relationship between the furnace and the material passing therethrough can be better understood, a sheet of material 24 is shown in FIGS. 1 and 2 as being transported through the furnace. As can easily be seen, the bottom edge of the sheet 24 rests on the upper section of the loop of conveyor belt 15, while the upper portion of the sheet 24 extends to a point immediately above the upper heater elements. Extending longitudinally of the furnace within top 16c is a duct or channel 25 which is adapted to receive the supporting fluid after it passes upwardly through the tunnel 17. The channel 25 is in continuous communication with the tunnel 17 throughout its entire length so that the supporting fluid may be continuously discharged from the tunnel 17 into the channel 25. It should be understood that suitable slotted closure means are provided for the ends of the tunnel 17 and conduit 21 to limit the escape of the support fluid therefrom. These closure means have been remmoved to facilitate the showing of the furnace and manifold.

In order that the fluid which is employed to support the sheet 24 may be delivered under pressure to the base of the sheet material and removed from the channel extending above the sheet material, a circulating system 26 is provided outside of the furnace 12. The circulating system 26 is designed to exhaust the air or fluid from the channel 25 and redeliver it under increased pressure to the lower manifold or channel 21. In order to accomplish this recirculation of air, a suitable pump or centrifugal blower 27 is utilized. To connect the channel 25 to the intake of the pump 27 a series of conduits 28 are employed. In the particular application illustrated, the conduit 28 is made up of three intake members 28a which are connected to a common delivery duct 28b. The delivery duct 28b then connects to a bifurcated pump inlet connection 28c which comprises two sections of duct which supply air to the axially spaced inlets of the pump 27. The output of the pump 27 is connected through a conduit 29 to the manifold 21 which surrounds the base of the sheet 24.

As was explained, and as is illustrated by the arrows in FIGS. 1 and 2, the supporting fluid or air is delivered by the pump 27 through the conduit 29 to the conduit 21 under pressure. By providing suitable closure means at the ends of conduit 21, the only escape passage for the air under pressure within the manifold 21 is upwardly through the tunnel 17 to the conduit or channel 25. Because of the size of the manifold 21 the volume of air delivered therein and the fact that the sheet 24 is centered on the conveyor 15, an equal volume rate of flow is obtained on each side of the sheet 24 when the sheet is located in its center-most position between the walls 16a.

Since the volume rate of flow on either side of the sheet 24 would be seriously effected by any displacement of the bottom of the sheet to one side or the other, the series of centering fixtures 15a are necessary to perform this function. If the top of sheet 24 becomes displaced from this center position, it should be obvious that the fluid or air within the passage on the side which has become more obstructed will create an increased pressure, whereas, there will be decreased pressure within the passageway adjacent the opposite face. This pressure differential will tend to be eliminated by the movement or displacement of the top of the sheet toward the side wherein the lower pressure exists. This action will, of course, recenter the sheet material within the tunnel 17. The exhaust duct or channel 25, into which the air flows after leaving the tunnel 17 is fairly large so that the back pressures on both sides of the sheet material will tend to be equal at all times. By recirculating the air from channel 25 through the ducts 28 to the inlet of pump 27, a reduced pressure is created in the channel 25 and a plentiful supply of preheated air is provided for use as a supporting medium. It is also contemplated that when supporting material in a controlled atmosphere furnace the recirculation of the atmosphere gas used also as the supporting medium would permit economical operation.

It should, of course, be understood that in material handling applications outside the furnace field, it would probably be unnecessary to recirculate the support fluid. In such instances, there would be no need for the upper conduit 25 and the tunnel 17 could be merely left open at the top.

By way of illustration and with no intention of limiting the scope of the disclosure, a number of the design details may be brought out of a specific embodiment constructed in accordance with the teachings of the invention. In constructing an embodiment which would suitably support 1/16" sheet aluminum, it was found that if the sheet 24 in FIGS. 1 and 2 is approximately 3' x 6' that a one horsepower centrifugal blower provides more than enough supporting air to maintain the sheet centered in the tunnel 17. In such an application when the narrowest width of the tunnel 17 adjacent the bottom of the sheet 24 was made 2" and the width at the top of the walls 16a made 4", satisfactory operation was obtained. It should be obvious that by decreasing the dimensions of the tunnel 17 a smaller quantity of supporting air could maintain the sheet in its centered position. With proper wall spacing and air flow, it has been found that the sheet material can be supported perfectly even when in a plastic or near molten state. The fairly uniform support achieved across the entire wall of the material prevents collapse of the sheets even when they become so plastic that they would otherwise not support themselves if only balanced in the vertical position.

The embodiment of the invention disclosed in FIGS. 1 and 2 represents only one means by which a fluid could be used to balance a piece of sheet material in a substantially vertical position for material handling purposes. In this first embodiment all the supporting air is received from a single supply manifold extending beneath the tunnel in which the sheet material is supported. The manifold 17 could be divided longitudinally so as to form two separate manifolds delivering equal volumes of air to each side of the sheet to be supported. It is also contemplated that the supporting fluid could be delivered through a plurality of spaced orifices positioned well above the bottom of the sheet to be supported.

Referring to FIG. 3 of the drawing, an embodiment of the invention is shown which is functionally similar to the embodiment of FIGS. 1 and 2, but which is adapted to more general application than merely in the furnace field. The perspective view of FIG. 3 comprises only a portion of an elongated material handling conveyor designated generally as reference numeral 35. The conveyor 35 utilizes a conveyor belt 15 similar in function and design to the one described in connection with FIG. 1. It should be understood, however, that in this more general application the belt 15 need not be of woven wire or heat resistant material, but could be of rubber, fabric or any other material conventionally used for material handling conveyor belts.

In addition to the belt 15, the material handling conveyor 35 includes a supporting or balancing means which takes the form of a sheet metal trough 36. The sheet metal trough 36 may have slightly inclined walls and is of such height as to substantially enclose the sheet material to be transported therethrough. The trough 36 has a pair of substantially vertical walls 36a and a bottom manifold member 36b which is formed integrally therewith. The manifold member 36b is open along a slot 36c in its upper surface extending longitudinally thereof. The slot 36c in the manifold 36b opens directly into the space between the walls 36a so that the walls 36a and manifold 36b define a volume having a cross section resembling an inverted T. The belt 15 is positioned within the manifold 36b and extends horizontally immediately below the slot 36c in the manifold.

To supply a quantity of supporting air to the material handling conveyor 35, a suitable pump 27 is employed. As in the preceding embodiment, it is connected by means of a duct 29 to the manifold 36b extending beneath the sheet material to be supported. In contrast to the earlier embodiment, the pump 27 does not recirculate air, but merely draws air from the atmosphere and supplies it to the manifold 36b through the duct 29. It should be understood that in the case of a long conveyor 35, it would be necessary to utilize a plurality of pumps 27 at spaced positions along the manifold 36b. With the exception of the omission of the recirculating aspect and the omission of the heating elements and fire brick construction, the embodiment of FIG. 3 is essentially the same as that disclosed in FIGS. 1 and 2 and operates in substantially the same manner. The supporting air delivered under pressure to the manifold 36b seeks escape from the trough 36 through the two slot-like openings between the sheet material 24 and the walls 36a of the trough 36. In the same manner as was described above, the air passing between the sheet and the walls of the enclosure maintains the sheet 24 centered therein.

The more general embodiment disclosed in FIG. 3 has many applications in the material handling of large sheets or of strip material, in that the sheets handled by this invention are contacted by a solid body only along their lower edges and nowhere along their faces. It is extremely desirable for use in applications where the sheet material has been recently painted or cleansed by degreasing or the like and contamination or contact by foreign bodies is to be carefully avoided.

The embodiments of FIGS. 4 and 5 represent modifications in the manner in which the air is supplied to the volume between the sheet material and the walls 36a of the conveyor trough. In the embodiment of FIG. 4 the conveyor 35 is provided with a plurality of vertically extending manifolds 38 which supply air to the trough 36 through a series of slots 39 which extend vertically in the walls 36a of the trough 36. It should be noted that the slots 39 are of V-shape being wider at the top than at the bottom. This shaping of the slot 39 serves to control the quantity of air delivered to various portions of the sheet. The embodiment of FIG. 4 is suitable primarily for applications where fairly stiff or rigid sheets of substantial length are to be transferred. Under such circumstances, it is unnecessary to space additional slots 39 close together. If this type of apparatus is employed with very flexible material, the slots 39 must be closely spaced to provide adequate support. It should be understood that by inclining the slots 39 in the plane of the walls 36a, a greater spacing may be permitted between adjacent slots while still achieving adequate support.

The embodiment of FIG. 5 utilizes a large box-like manifold member 42 to deliver air to a plurality of orifices 43 which are formed in the walls 36a of the trough 36. The manifolds 42 are positioned on both sides of the trough 36 and additional manifolds may be provided if the length of the conveyor requires it. It should be understood that air is supplied by a suitable pump 27 through the conduit or duct 29 to the manifold 42. In that the orifices 43 extend through the walls 36a into the manifold 42, the air supplied to the manifold 42 is discharged through the orifices into the volume contiguous to the wall 36a.

Both the embodiments of FIGS. 4 and 5 operate in a somewhat different fashion to the embodiments of FIGS. 1 to 3. In all the various constructions, the sheet 24 is maintained centered by virtue of the flow of equal volumes of air into the spaces on either side of the sheet material. When the air is supplied directly against the faces of the sheet 24 as in the structures shown in FIGS. 4 and 5, the velocity of the impinging air contributes to the balancing effect. That is, if the sheet tends to become displaced toward the orifices on one side of the sheet, the velocity of the air striking the sheet on that side will be greater than it was in the centered position and this velocity will also be greater than the velocity of the air impinging on the other side of the sheet. This differential in velocities will result in a force being exerted on one side of the sheet tending to center it in the trough 36. This velocity effect will add to the previously described pressure effects which also tend to maintain sheet 24 centered in trough 36.

Although all the embodiments as shown in FIGS. 1 to 5 disclose the spaced walls of the furnace or conveyor diverging slightly from bottom to top, it should not be assumed that this divergence is a necessary feature of construction. Such construction is occasionally desirable to achieve a particular uniform temperature across the faces of the sheet material. Depending on the arrangement of the fluid distribution system for the supporting medium, it may be more advantageous to have the walls positioned vertically or possibly inclined toward each other somewhat.

FIGS. 6 and 7 are examples of embodiments wherein the angular relationship between the furnace walls and the vertically positioned sheet material has been varied for some particular purpose. Referring to FIG. 6 the generally vertical side walls of the furnace are designated by reference numeral 16. In addition, the furnace has a base or foundation 16f and a longitudinally extending conveyor 13 which is of similar design and serves the same function as the conveyor in the embodiment of FIGS. 1 and 2. The conveyor belt 15 is also provided with centering fixtures 15a which serve to locate the base of the sheet material 24 in the middle of the space between the walls 16 of the furnace. The longitudinally extending passageway 50 in the embodiment of FIG. 6 is generally triangular in cross-section. The walls 16 of the furnace diverge outwardly from the apex where they meet at the upper portion of the furnace. At the base of the furnace adjacent the conveyor 13 the side walls are spaced apart. Immediately below the lower edges of the side walls 16, a plurality of air discharge openings 51 are provided to permit escape of the combustion gas from the passage 50 in the furnaces.

The fluid support in the embodiment of FIG. 6 is accomplished by means of the gases which are burned to heat the sheet material passing therethrough. The combustion of the gases is accomplished by means of a plurality of air gas burners 52 which are mounted on the side walls 16 of the furnace. These burners are preferably excess air type burners. The combusted gases supplied by the burners 52 on both sides of the sheet material 24 provide the necessary means to balance the sheet material in a similar fashion to the supporting air of the embodiment of FIG. 5. The selection of the downwardly diverging walls 16 to form the triangular shaped passage 50 was motivated by the desire for a uniform temperature gradient across the sheet material. Since, in this embodiment the heated gases are passing downwardly and exiting at the bottom of the furnace rather than at the top, the greater spacing of the side walls is necessary at the bottom to prevent overheating of the sheet material in this area.

The sectional view of the furnace in FIG. 7 merely discloses another variation wherein the spacing of the furnace walls has been varied to obtain a uniform temperture gradient. In the embodiment of FIG. 7 the combusted gases are discharged not only through the bottom openings 51 but also through the top opening 53. In order that a uniform temperature gradient be achieved from the center of the sheet downward and from the center of the sheet upward, it is necessary that the side walls diverge from the center downward and from the center upward. As in the case of FIG. 6, the principles by which the sheet material 24 is supported therein are the same as those which have been explained in detail with respect to the embodiment of FIG. 5.

It is also contemplated that the supporting fluid, in embodiments such as are disclosed in connection with FIGS. 4 and 5, may be utilized to advance the sheet or web material. In such applications it would be preferable to utilize a substantially frictionless supporting track such as a simple roller conveyor along which the sheet material would be propelled by the supporting fluid. To advance the sheet material by means of the supporting fluid, it would be necessary to introduce the fluid into the passageway between the walls 36 and the sheet material with a forward velocity component as discharged from jets or nozzles. The fluid impinging on the sheet material would, by virtue of the forward velocity component, tend to slide the material horizontally along the conveyor as well as supporting it in the vertical position spaced between the walls 36.

While there have been shown and described particular embodiments of the present invention, it will be apparent to those skilled in the art that various modifications may be made without departing from the invention in its broader aspects and it is therefore aimed in the appended claims to cover all such changes and modifications as fall within the true spirit and scope of the present invention.

What is claimed as new and desired to be secured by Letters Patent of the United States is:

1. Conveyor apparatus for sheet material comprising a supporting structure for physically engaging the lower edge of a vertically positoned sheet of material to support the weight of said sheet of material, balancing means for said sheet material including a pair of vertically extending spaced wall members positioned closely adjacent a central vertical plane in which said sheet material is positioned, fluid supply means for delivering equal quantities of fluid across the spaced faces of each of said wall members and means confining said fluid between said faces of said wall members and said sheet material to form cushions of fluid to balance said sheet material in a vertical position, said fluid being the sole force exerting agency for balancing said sheet material in a vertical position on said supporting structure.

2. Material handling apparatus for sheet material comprising a belt conveyor for supporting a sheet of material on edge, a pair of spaced wall members extending parallel to the direction of movement of said conveyor and spaced immediately adjacent a central vertical plane in which said sheet material is positioned, a supply manifold connected to the bottoms of said wall members and in continuous communication with the space between said wall members, a pump connected to said supply manifold to deliver fluid to said supply manifold, and means confining said fluid between said wall members and the faces of said sheet material to form cushions of fluid to balance said sheet material in the vertical position, the pressure of said fluid providing the sole force balancing said sheet on edge on said conveyor.

3. A furnace for heat treating sheet material comprising a thin vertical chamber elongated in the horizontal direction, a conveyor means positioned adjacent to the bottom of said elongated chamber means secured to said conveyor for positioning said material centrally between the walls of said chamber, for supporting said material on edge, a fluid supply manifold in continuous communication with the bottom of said chamber to supply equal quantities of fluid to the opposite faces of said sheet material, a recirculation manifold in continuous communication with the top of said chamber, a fluid pump having an air intake opening and an air delivery opening, a conduit means connecting the intake opening to said recirculation manifold and said delivery opening to said fluid supply manifold, said chamber surrounding said sheet material to confine between the faces of said sheet material and the vertical walls of said chamber thin cushions of fluid delivered by said pump, said fluid providing the sole force exerting agency for balancing said sheet material in an upright position of said conveyor.

4. A furnace for heat treating sheet material comprising a thin elongated heated chamber, a fluid supply manifold in continuous communication with the bottom of said chamber, conveyor means positioned within said supply manifold immediately below said chamber to support on edge sheet material positioned within said chamber, a recirculation manifold in continuous communication with the top of said chamber, a fluid pump having an intake opening and a delivery opening, and conduit means connecting the intake opening to said recirculation manifold and said delivery opening to said fluid supply manifold, the fluid delivered to said chamber by said pump providing the sole force exerting agency for balancing said sheet material on edge on said conveyor.

5. A furnace for heat treating sheet material comprising a thin vertical heated chamber extending horizontally, an elongated conveyor extending along the bottom of said heated chamber for supporting said material on edge in a vertical position, the said heated chamber being defined in part by a pair of closely spaced walls between which said sheet material is adapted to be transferred in the vertical position on said conveyor means secured to said conveyor for positioning said sheet material centrally with respect to the vertical walls of said chamber, and fluid distribution means for supplying equal quantities of heated fluid to the spaces adjacent the faces of said spaced walls, said chamber confining between the faces of said sheet material and the adjacent faces of said walls thin cushions of said heated fluid which balance said sheet material in a vertical position, said heated fluid being the sole force exerting agency for balancing said sheet material in a vertical position.

6. The furnace defined in claim 5 wherein said spaced walls are upwardly diverging, the exit opening for said heated fluid being at the top of said heated chamber.

7. The furnace defined in claim 5 wherein said spaced walls are downwardly diverging, the exit opening for said heated fluid being at the bottom of said heated chamber.

8. The furnace defined in claim 5 wherein said spaced walls diverge from the central horizontal plane upwardly and downwardly, said heated fluid being discharged at the top and bottom of said heated chamber.

9. The method of conveying sheet material along a path comprising placing said sheet material in a vertical position with the lower edge in engagement with a support means, directing equal volumes of gases across the faces of said sheet material, confining said gas in thin layers against said faces whereby any deviating of said sheet from the vertical position causes a differential in pressure between the two faces of the sheet, said pressure differential moving said sheet back to its vertical position, and moving said sheet material lengthwise while balanced in the vertical plane by said layers of gas.

10. The method of conveying sheet material comprising positioning said sheet material in a vertical position with the lower edge thereof in engagement with a conveying means while the faces and top of said sheet are out of contact with any solid supporting means, directing equal volumes of gases across the faces of said sheet material, enclosing said volumes of gases against said faces to maintain increased pressures for balancing said sheet in the vertical position, and rebalancing said sheet in the vertical position by applying a greater gas pressure on the face of said sheet on the side toward which it tilts from the vertical.

11. The method of conveying sheet material comprising positioning said sheet material in a vertical position with the lower edge thereof in engagement with a conveying means while the faces and top of said sheet are out of contact with any solid supporting means, directing gas of sufficient force across the faces of said sheet material to produce equal balancing forces on opposite faces of said sheet to balance said sheet in the vertical position, and rebalancing said sheet in the vertical position by increasing the pressure exerted by the gas on the face of said sheet on the side toward which it tilts from the vertical.

12. The method of heat treating sheet material comprising placing said sheet material in a vertical position supported on its lower edge, heating a quantity of gas, delivering said gas under pressure to the opposite vertical faces of said sheet material, confining said quantities of gas under sufficient pressure against said faces to balance said sheet material on edge in said vertical position, and rebalancing said sheet material in its vertical position by increasing the pressure exerted by the gas on the face of said sheet material toward which it tilts from the vertical.

13. Conveyor apparatus as set forth in claim 1 wherein said supporting structure comprises a belt conveyor for transporting said sheet material between said spaced wall members.

14. Conveyor apparatus as set forth in claim 2 including an exhaust manifold connected to the tops of said wall members in continuous communicataion with the space between said wall members, and conduit means connecting the intake of said pump to said exhaust manifold.

15. Conveyor apparatus as set forth in claim 1 wherein said supporting structure comprises a substantially frictionless track and said fluid supply means includes means for directing said fluid across the sides of said sheet with a velocity component to cause said sheet to move lengthwise on said supporting structure.

16. Conveyor apparatus as set forth in claim 1 wherein said fluid supply means includes a plurality of orifices formed in said wall members and means for delivering equal volumes of fluid through the orifices of each of the spaced wall members.

17. Conveyor apparatus as set forth in claim 16 including a plurality of manifolds communicating with said orifices, and pump means for supplying fluid to said manifolds.

18. Conveyor apparatus as set forth in claim 1 wherein said fluid supply means includes slots formed in said wall members in opposed spaced relation, a plurality of manifolds communicating with said slots, and pump means supplying fluid to said manifolds.

(References on following page)

References Cited in the file of this patent

UNITED STATES PATENTS

| | | |
|---|---|---|
| 1,701,223 | Bergman | Feb. 5, 1929 |
| 1,751,712 | Owen | Mar. 25, 1930 |
| 1,779,622 | Dreffein | Oct. 28, 1930 |
| 2,035,746 | Hall | Mar. 31, 1936 |
| 2,393,521 | Duncan et al. | Jan. 22, 1946 |
| 2,591,621 | Shegda | Apr. 1, 1952 |
| 2,749,109 | Maud | June 5, 1956 |
| 2,805,898 | Willis | Sept. 10, 1957 |
| 2,848,820 | Wallin et al. | Aug. 26, 1958 |

FOREIGN PATENTS

| | | |
|---|---|---|
| 2,535,983 | France | Dec. 26, 1950 |